United States Patent
Kwak et al.

(10) Patent No.: US 7,499,435 B2
(45) Date of Patent: Mar. 3, 2009

(54) PARTIAL COMBINING METHOD AND APPARATUS FOR MULTIMEDIA BROADCAST/MULTICAST SERVICE

(75) Inventors: No-Jun Kwak, Seoul (KR); Kook-Heui Lee, Yongin-si (KR); Sung-Ho Choi, Suwon-si (KR); Kyeong-In Jeong, Suwon-si (KR); Gert Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 11/239,671

(22) Filed: Sep. 30, 2005

(65) Prior Publication Data

US 2006/0067281 A1 Mar. 30, 2006

(30) Foreign Application Priority Data

Sep. 30, 2004 (KR) ...................... 10-2004-0078108

(51) Int. Cl.
*H04B 7/212* (2006.01)
(52) U.S. Cl. ..................................... 370/337
(58) Field of Classification Search .................. 370/337
See application file for complete search history.

(56) References Cited

U.S. PATENT DOCUMENTS

2003/0119452 A1   6/2003   Kim et al.
2003/0231612 A1   12/2003  Kim et al.
2004/0008646 A1   1/2004   Park et al.
2004/0152476 A1   8/2004   Kuwano et al.
2006/0067281 A1*  3/2006   Kwak et al. ................. 370/337

FOREIGN PATENT DOCUMENTS

EP          1 372 350         12/2003
WO      WO 2004-028039 A1     4/2004

OTHER PUBLICATIONS

"Universal Mobile Telecommunications System (UMITS); Introduction of Multimedia Boradcast/Multicast Service (MBMS) in the Radio Access Network (Ran); Stage 2 (3GPP TS 25.346 version 6.1.0 Release 6)"; ETSI TS 125 346; ETSI Standards, European Telecommunications Standards Institute, Sophia-Antipolis US Cedex, France, Jun. 2004, pp. 1-26.

* cited by examiner

*Primary Examiner*—William D Cumming
(74) *Attorney, Agent, or Firm*—Roylance, Abrams, Berdo & Goodman, LLP

(57) ABSTRACT

A method and apparatus for enabling partial combining on a Multimedia Broadcast/Multicast Service (MBMS) service are provided where a radio network controller (RNC) specifically informs a user equipment (UE) whether an MBMS service signal of the current cell is combinable with the same MBMS service signals received from different cells for each individual service or timing, through an MCCH or an MSCH, which is a type of a logical channel for an MBMS service, in a Uu interface. The UE combines the MBMS service signals transmitted from the different cells, thereby obtaining a gain in terms of utilization of transmission power and radio resources.

44 Claims, 11 Drawing Sheets

PARTIAL COMBINING METHOD AND APPARATUS FOR MULTIMEDIA BROADCAST/MULTICAST SERVICE

CROSS-REFERENCE TO RELATED APPLICATION

This application claims benefits under 35 U.S.C. § 119 from a Korean Patent Application Serial No. 2004-78108 filed in the Korean Intellectual Property Office on Sep. 30, 2004, the entire disclosure of which is hereby incorporated by reference.

BACKGROUND OF THE INVENTION

1. Field of the Invention

The present invention relates generally to a Multimedia Broadcast/Multicast Service (MBMS) service. In particular, the present invention relates to a method and apparatus for enabling partial combining of an MBMS service.

2. Description of the Related Art

Currently, with the development of communication technology, services provided by a wideband Code Division Multiple Access (CDMA) mobile communication system are evolving into packet service communication for transmitting not only the conventional voice service but also high-capacity data such as packet data and circuit data, and into multimedia broadcast/communication capable of transmitting multimedia services. In order to support the multimedia broadcast/communication, researches are being conducted on an MBMS service in which one or more multimedia data sources provide services to a plurality of user equipments (UEs).

The term "MBMS service" refers to a service for transmitting the same multimedia data to a plurality of users via a wireless network. The MBMS service enables the plurality of users to share one radio channel, thereby saving radio transmission resources. The MBMS service requires a large amount of transmission resources, as it supports transmission of multimedia data such as real-time image and voice, still image and text, and can simultaneously transmit voice data and image data according to the type of the multimedia data. In the MBMS service where the same data must be transmitted to a plurality of cells where the users are located, Point-to-Point (PtP) connection or Point-to-Multiple point (PtM) connection is achieved according to the number of the users located in each cell.

FIG. 1 is a diagram schematically illustrating nodes involved in an MBMS service in a mobile communication network.

Referring to FIG. 1, UEs 161, 162, 163, 171 and 172 mean terminal devices or subscribers capable of receiving the MBMS service, and a cell#1 160 and a cell#2 170 are logical or geographical areas where they wirelessly transmit MBMS-related data to their subscribers. The cell#1 160 and the cell#2 170 are controlled by the associated Node Bs. A radio network controller (RNC) 140 controls a plurality of the cells 160 and 170, selectively transmits multimedia data to a particular cell, and controls a radio channel established to provide the MBMS service. Connection between the RNC 140 and the UEs 161 through 172 is achieved through a radio resource control (RRC) interface.

The RNC 140 is connected to a packet switched or packet service (PS) network such as the Internet by a serving GPRS support node (SGSN) 130. Communication between the RNC 140 and the PS network is achieved by packet switched signaling (PS signaling). In particular, connection between the RNC 140 and the SGSN 130 is called an Iu-PS interface.

The SGSN 130 controls an MBMS-related service for each of the subscribers. Typically, the SGSN 130 takes charge of managing service accounting-related data for each user and selectively transmitting multimedia data to a particular RNC 140.

A transmit network 120 provides a communication path between a broadcast multicast service center (BM-SC) 110 and the SGSN 130, and can be connected to an external network by a gateway GPRS support node (GGSN; not shown). The BM-SC 110, a source of MBMS data, takes charge of scheduling on the MBMS data.

In addition, the RNC 140 is connected to a circuit switched (CS) network (not shown) by a mobile switching center (MSC) 150. The CS network refers to an access-based voice-oriented legacy communication network. Communication between the RNC 140 and the MSC 150 is achieved by circuit switched signaling (CS signaling). In particular, an access between the RNC 140 and the MSC 150 is called an Iu-CS interface An MBMS data stream is delivered to the UEs 161, 162, 163, 171 and 172 via the transmit network 120, the SGSN 130, the RNC 140 and the cells 160 and 170. Although not illustrated in FIG. 1, a plurality of SGSNs can exist for one MBMS service and a plurality of RNCs can exist for each of the SGSNs. Each of the SGSNs performs selective data transmission to its RNCs, and each of the RNCs performs selective data transmission to a plurality of its cells. To this end, each of the nodes stores therein a list (list of RNCs for the SGSN, and list of cells for the RNC) of nodes to which it must transmit the data stream, and later performs selective MBMS data transmission only to the nodes in the stored list.

In order for the MBMS data transmitted up to each of the cells to be successfully delivered to the UEs, several MBMS logical channels are used. Among the MBMS logical channels, an MBMS control channel (MCCH) carries MBMS control information including the type of an MBMS service provided in each cell, channel information, and MBMS information from neighboring cells, so that the UE can successfully receive the MBMS data. An MBMS traffic channel (MTCH) is a logical channel for carrying actual MBMS data. The MCCH and the MTCH, when transmitted on a PtM basis, are mapped to a forward access channel (FACH) which is a kind of a transport channel, and the FACH is mapped to a secondary common control physical channel (S-CCPCH) before being physically transmitted. In one cell, each MBMS service is generally mapped to different MTCHs, and the MTCHs can be mapped to one S-CCPCH by time division multiplexing (TDM). When several MBMS services are mapped to one S-CCPCH, the UE unnecessarily wastes power in receiving undesired service.

In order to solve the problem, the $3^{rd}$ Generation Partnership Project (3GPP) group defines a logical channel called an MBMS scheduling channel (MSCH), being mapped to the S-CCPCH, and includes, in the MSCH, scheduling information for MBMS services included in the S-CCPCH such that the UE can selectively receive desired service.

Generally, the WCDMA system can achieve a gain in terms of utilization of transmission power and radio resources by combining the same-content data transmitted from different cells, and this can be applied even to the MBMS service. If one physical channel is equal in content to a physical channel transmitted from another cell, the physical channels received from two cells can be combined with each other at anytime. This combining is called "full combining." However, if data on the two channels is partially equal, only the same part can be combined, and this is called "partial combining."

In the case of the MBMS service, because S-CCPCHs transmitted from a plurality of cells undergo different scheduling, the UE must partial-combine only the data in the period where its interested service is located among MBMS services included in the S-CCPCHs. Therefore, the different S-CCPCHs transmitted from the plurality of cells require a method for efficiently performing partial combining according to the corresponding scheduling.

SUMMARY OF THE INVENTION

An object of the present invention is to address at least the above problems and/or disadvantages and to provide at least the advantages below. Accordingly, an object of the present invention is to provide a method and apparatus for enabling partial combining on an MBMS service.

Another object of the present invention is to provide a method and apparatus for specifically indicating whether each MBMS signal is combinable with MBMS signals received from other cells per service or time in an MCCH or an MSCH.

According to one aspect of the present invention, there is provided a method for performing partial combining on a desired Multimedia Broadcast/Multicast Service (MBMS) service by a user equipment (UE) in a mobile communication system supporting an MBMS service. The method comprises the steps of receiving partial combinable information indicating whether a desired MBMS service is partial combinable between a physical channel of a primary cell where the UE is located and physical channels of neighboring cells, determining whether it is possible to partial-combine the physical channel of the primary cell with the physical channels of the neighboring cells, according to the partial combinable information, if the partial combining is possible, receiving MBMS service signals of the desired MDMS service through the physical channel of the primary cell and the partial-combinable physical channels of the neighboring cells, and combining the received MBMS service signals.

According to another aspect of the present invention, there is provided an apparatus for performing partial combining on a desired Multimedia Broadcast/Multicast Service (MBMS) service by a user equipment (UE) in a mobile communication system supporting an MBMS service. The apparatus comprises a receiver for receiving partial combinable information indicating whether a desired MBMS service is partial combinable between a physical channel of a primary cell where the UE is located and physical channels of neighboring cells, a reception controller for determining whether it is possible to partial-combine the physical channel of the primary cell with the physical channels of the neighboring cells, according to the partial combinable information, physical channel receivers for, if the partial combining is possible, receiving MBMS service signals of the desired MBMS service through the physical channel of the primary cell and the partial-combinable physical channels of the neighboring cells, and a combiner for combining the received MBMS service signals.

According to yet another aspect of the present invention, there is provided a method for supporting partial combining on a Multimedia Broadcast/Multicast Service (MBMS) service that a user equipment (UE) desires to receive, in a mobile communication system supporting an MBMS service. The method comprises the steps of generating partial combinable information indicating whether a desired MBMS service of the UE is partial combinable between a physical channel of a primary cell where the UE is located and physical channels of neighboring cells, transmitting the generated partial combinable information, and simultaneously transmitting MBMS service signals of the desired MBMS service through the physical channel of the primary cell and the partial-combinable physical channels of the neighboring cells, at a transmission start time of the desired MBMS service.

According to yet another aspect of the present invention, there is provided an apparatus for supporting partial combining on a Multimedia Broadcast/Multicast Service (MBMS) service that a user equipment (UE) desires to receive, in a mobile communication system supporting an MBMS service. The apparatus comprises a radio network controller (RNC) for generating partial combinable information indicating whether a desired MBMS service of the UE is partial combinable between a physical channel of a primary cell where the UE is located and physical channels of neighboring cells, and a plurality of cell transmitters for simultaneously transmitting MBMS service signals of the interested MBMS service through the physical channel of the primary cell and the partial-combinable physical channels of the neighboring cells, at a transmission start time of the desired MBMS service.

BRIEF DESCRIPTION OF THE DRAWINGS

The above and other exemplary objects, features and advantages of the present invention will become more apparent from the following detailed description when taken in conjunction with the accompanying drawings in which like reference symbols indicate the same or similar components, wherein.

DETAILED DESCRIPTION OF EXEMPLARY EMBODIMENT

Figure 1:
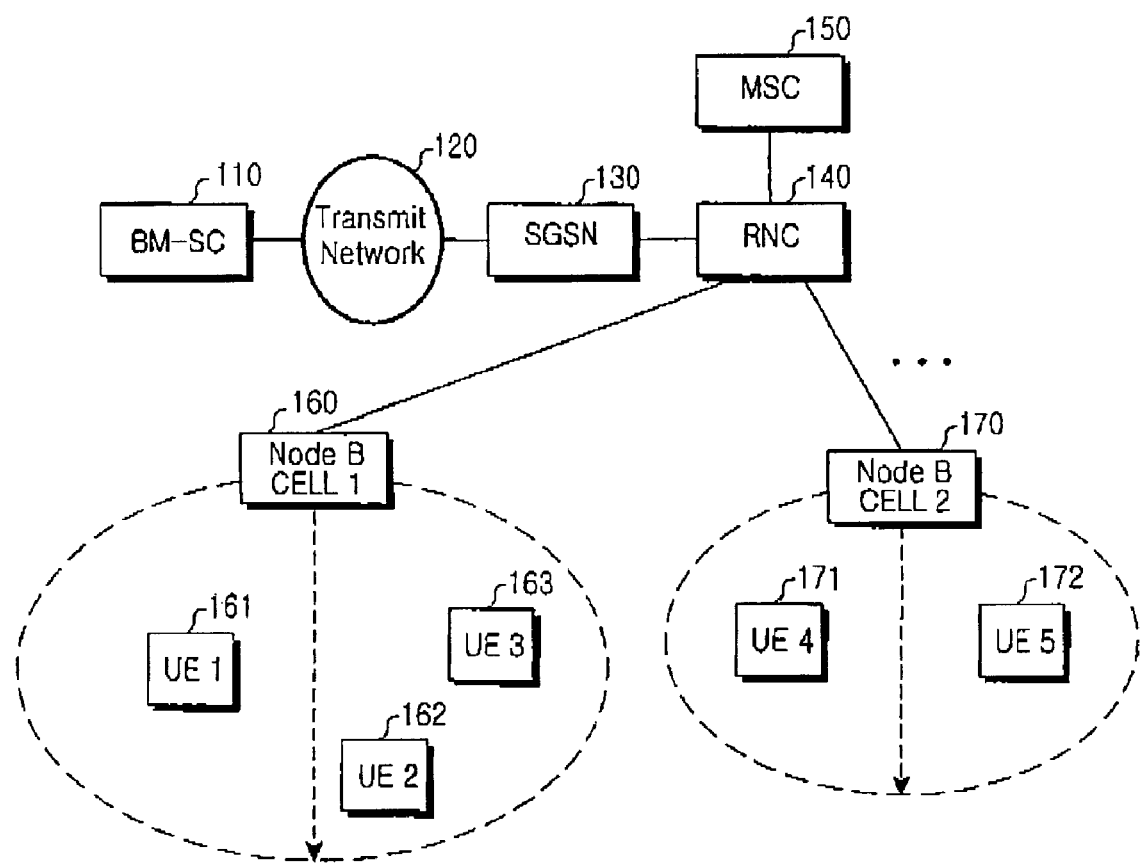
FIG. 1 is a diagram illustrating network configuration for a Multimedia Broadcast/Multicast Service (MBMS) service.

Several exemplary embodiments of the present invention will now be described in detail with reference to the annexed drawings. As noted above, in the drawings, the same or similar elements are denoted by the same reference numerals even though they are depicted in different drawings. In the following description, a detailed description of known functions and configurations incorporated herein has been omitted for conciseness.

One of the exemplary objects of the present invention is to specifically inform a UE of partial-combinable MBMS services so that the UE can partial-combine MBMS service signals transmitted from a plurality of cells, which underwent different scheduling. The cells transmit their physical channels, namely S-CCPCHs, using different channel codes. The S-CCPCHs include TDM-multiplexed MTCHs related to a plurality of MBMS services through different scheduling.

Therefore, an RNC in charge of scheduling on MTCHs for each cell schedules MTCHs mapped to each cell, namely, each S-CCPCH, for MBMS services, and informs a UE of combinable MBMS services according to the scheduling. The term "combinable MBMS services" refers to the services transmitted from different cells with the same contents for the same time period.

A detailed description will now be made of channel structures of S-CCPCHs for carrying MBMS services partial-combinable by a UE.

First Exemplary Embodiment

A first exemplary embodiment provides, for each MBMS service transmitted from one cell, partial combinable information indicating partial-combinable physical channels of other cells to UEs located in the cell through an MCCH transmitted from the cell.

Figure 2:
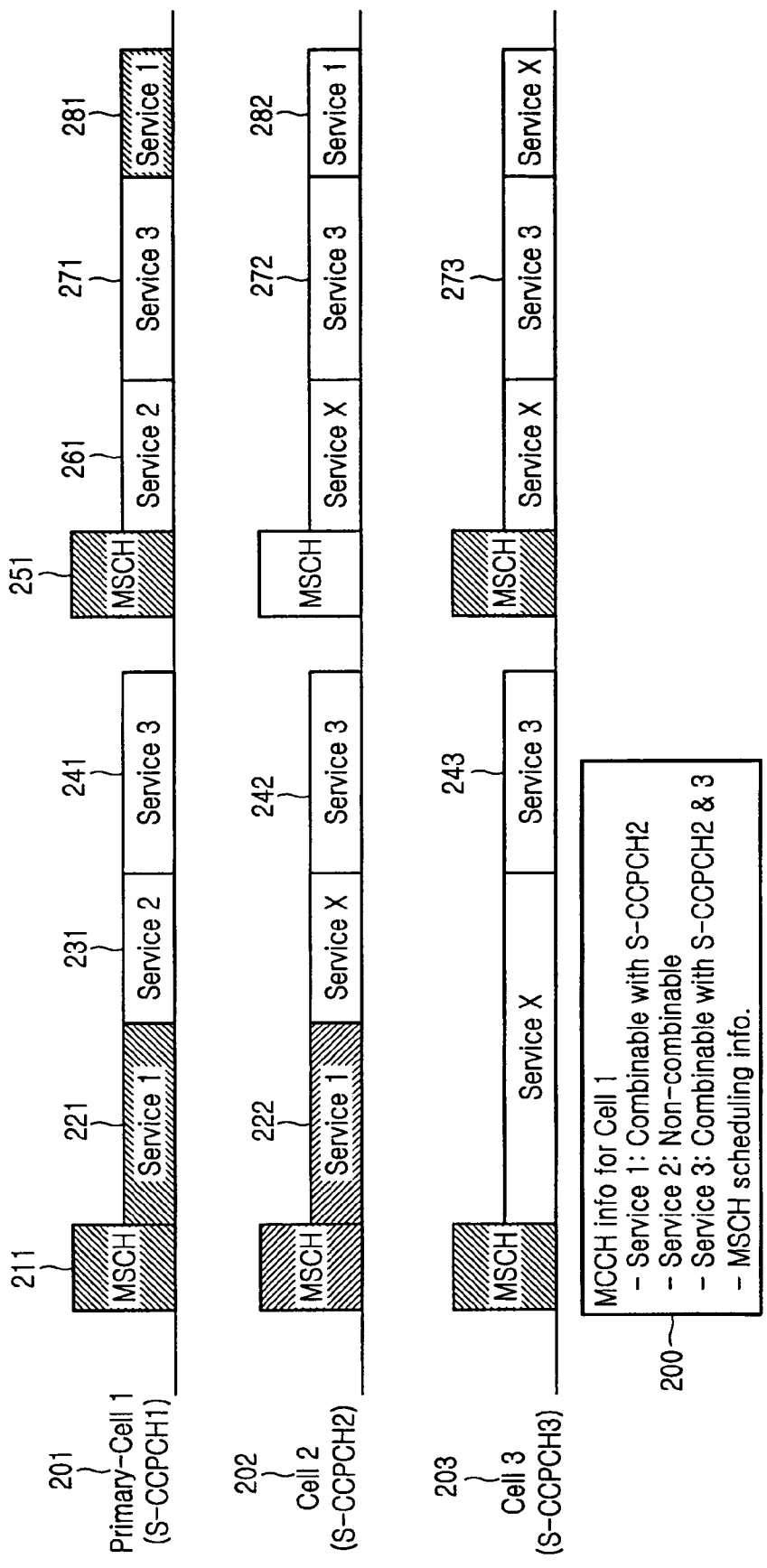
FIG. 2 is a diagram illustrating a channel structure according to a first exemplary embodiment of the present invention.

FIG. 2 is a diagram illustrating a channel structure according to the first exemplary embodiment of the present invention.

Referring to FIG. 2, in a cell#1 201 which is a primary cell, MBMS services are transmitted through an S-CCPCH1, and there are a cell#2 202 and a cell#3 203 neighboring the cell#1 201. In the cell#2 202 and the cell#3 203, when MBMS services are being transmitted through an S-CCPCH2 and an S-CCPCH3, partial combinable information between the S-CCPCH1 and other physical channels is transmitted to UEs located in the cell#1 201 through an MCCH. MCCH information of the cell#1 201 includes the partial combinable information, and MSCH scheduling information indicating positions of MSCHs 211 and 251 mapped to the S-CCPCH1.

The partial combinable information indicates that the S-CCPCH1 of the cell#1 201 is combinable with the S-CCPCH2 for a service #1, none of the physical channels is combinable with the S-CCPCH1 for a service #2, and the S-CCPCH1 is combinable with both the S-CCPCH2 and the S-CCPCH3 for a service #3. Once the partial combinable information is transmitted, MTCHs 221 and 281 related to the service #1, of the S-CCPCH1, are combined with MTCHs 222 and 282 of the S-CCPCH2, respectively, according to the partial combinable information, and MTCHs 241 and 271 related to the service #3, of the S-CCPCH1, are combined with MTCHs 242 and 272 of the S-CCPCH2 and MTCHs 243 and 273 of the S-CCPCH3, respectively. However, MTCHs 231 and 261 related to the service #2 designated as a non-combinable service are not combined with any other channels. Herein, "combining MTCHs" refers to combining MBMS service signals carried on each MTCH. In this specification, combining of MTCHs has the meaning of combining of MBMS service signals or combining of MBMS data.

The partial combinable information is included in current cell information or neighboring cell information transmitted through the MCCH of the cell#1 201. A description will now be made of each information element (IE) included in the current-cell information and the neighboring cell information.

Table 1 illustrates an example of the current cell information including the partial combinable information. The current cell information includes 'cell identity' indicating the current cell and 'S-CCPCH list'. The 'S-CCPCH list' includes 'Secondary CCPCH info' including information necessary for receiving an S-CCPCH of the current cell, 'MSCH schedule' indicating a position where an MSCH is located, 'Transport channel (TrCh) list' including 'TrCh information' for each transport channel and 'RB (Radio Bearer) information list', and 'combinable MBMS service info'. The 'combinable MBMS service info' indicates the partial combinable information, and includes 'MBMS service ID' and 'Secondary CCPCH in other cells'. The 'Secondary CCPCH in other cells' includes 'S-CCPCH ID' and 'Type of L1-combining' indicating rake combining or soft combining.

In Table 1, 'MSCH schedule' and 'combinable MBMS service info' are information for partial combining. A brief description of each field will be made herein below. 'MSCH schedule' indicates a position in the S-CCPCH, in which an MSCH is located. For example, if this field is set to '64', it means that the MSCH is transmitted in the current cell when 6 lower bits of a system frame number (SFN) become '0'.

'Combinable MBMS service info' indicates services partial-combinable with other cells among MBMS services existing in each S-CCPCH, and 'MBMS service ID' and 'Secondary CCPCH in other cells', which are lower Es of the 'combinable MBMS service info', specifically indicate whether each MBMS service can be combined with S-CCPCHs of other cells. Although not illustrated in Table 1, because generally one MBMS service is mapped to one RB, 'combinable MBMS service info' may exist under 'RB information list'.

'Secondary CCPCH in other cells' includes 'S-CCPCH ID' indicating at least one S-CCPCH combinable for 'MBMS service ID' and 'Type of L1-combining'. 'Type of L1-combining' indicates information for selecting one of rake combining and soft combining when both are available in Layer 1 (L1) which is a physical layer. If 'Type of L1-combining' is not present, selective combining happens in Layer 2 (L2).

TABLE 1

| Information Element/Group name | Need | Multi | Type and reference | Semantics description |
|---|---|---|---|---|
| Cell identity | OP | | | Current cell ID |
| S-CCPCH list | MP | maxSCCPCH | | |
| >Secondary CCPCH info | | | | |
| >MSCH schedule | OP | | e.g. (32, 64, 128, | indicates X, where scheduling information is |

TABLE 1-continued

| Information Element/Group name | Need | Multi | Type and reference | Semantics description |
|---|---|---|---|---|
| | | | 256, 512, 1024) | provided starting at SFNmodX = 0. |
| >Transport channel list | MP | maxTrCH per sCCPCH | | |
| >>TrCh information for each TrCh | MP | | | |
| >>RB information list | MP | maxRBperTrCh | | |
| >>>RB information per RB | MP | | | |
| >combinable MBMS service info | OP | maxCombinable MBMSsvcs | | if not present, the service is not combined. |
| >>MBMS service ID | MP | | TMGI | |
| >>Secondary CCPCH in other cells | MP | maxCombinableCells | | |
| >>>SCCPCH ID | MP | | Cell-ID + sCCPCH id | |
| >>>Type of L1-combining | OP | | Enumerated (Rake, Soft) | Only included if L1 combining is used. Otherwise, selective combining is performed. |

Table 2 below illustrates an example of the neighboring cell information including the partial combinable information. The neighboring cell information includes 'cell identity' indicating a neighboring cell, and 'S-CCPCH list'. 'S-CCPCH list' includes 'Secondary CCPCH info' including information necessary for receiving an S-CCPCH of the neighboring cell, and 'Transport Channel list'. 'Secondary CCPCH info' includes 'combinable MBMS service info' indicating the partial combinable information, and 'combinable MBMS service info' includes 'MBMS service ID', 'Reference SCCPCH in current cell' and 'Type of L1-combining'.

Describing each of the IEs, 'Reference SCCPCH in current cell' indicates an S-CCPCH possible for L1 combining such as rake combining and soft combining, and this IE is not included when selective combining is performed. Combinable services among the services transmitted through S-CCPCHs of the neighboring cells are indicated by 'MBMS service ID' of 'combinable MBMS service info', and when L1 combining is performed, S-CCPCHs of the current cell, to be combined for each service, are specified in 'Reference SCCPCH in current cell'. The other IEs have been described with reference to Table 1.

TABLE 2

| Information Element/Group name | Need | Multi | Type and reference | Semantics description |
|---|---|---|---|---|
| Cell identity | OP | | | Neighboring cell identity |
| S-CCPCH list | MP | maxSCCPCH | | |
| >Secondary CCPCH info | | | | |
| >>combinable MBMS service info | OP | maxCombinable MBMSsvcs | | if not preset, the service is not combined. |
| >>>MBMS service ID | MP | | TMGI | |
| >>>Reference sCCPCH in current cell | OP | | sCCPCH id | Only included if this sCCPCH is rake- or soft-combinable with an sCCPCH in the current cell. |
| >>>Type of L1-combining | CV-Ref | | Enumerated (Rake, Soft) | Only included if a reference id is included. |
| >Transport channel list | MP | maxTrCH per sCCPCH | | |
| >>TrCh information for each TrCh | MP | | | All TrCh's are indicated if at least 1 RB on the sCCPCH is L2-combinable |
| >>RB information list | MP | maxRBperTrCh | | |
| >>>RV information per RB | MP | | | Only information for RB's for which L2-combinign is supported are included. If included, this service provided in the neighboring cell is selective combinable with the service provided in the |

TABLE 2-continued current cell if received in non-L1-combinable periods.

| Condition | Explanation |
| --- | --- |
| CV-Ref | Mandatory present when a reference sCCPCH is indicated. Otherwise, ignored. |

As described above, scheduling on MTCHs mapped to each S-CCPCH is performed by an RNC. The RNC schedules the MTCHs mapped to each S-CCPCH such that MTCHs for a combinable MBMS service are located in the same periods in different S-CCPCHs. That is, as described above, the partial combinable information of Table 2 indicates that for the service #1, the S-CCPCH1 of the primary cell#1 201 is combinable with the S-CCPCH2 of the cell#2 202. Then the RNC performs scheduling such that MTCHs 221 and 281 for the service #1, carried on the S-CCPCH1, and MTCHs 222 and 282 for the service #1, carried on the S-CCPCH2, are located in the same periods. Similarly, MTCHs 241, 271, 242, 272, 243 and 273 for the service #3 are arranged in the same periods in all of the S-CCPCH1, the S-CCPCH2 and the S-CCPCH3.

Table 3 below illustrates an example of MSCH information according to the first exemplary embodiment of the present invention. The MSCH information includes 'Transmission start offset' and 'Transmission duration' indicating a start time and duration of a corresponding MBMS service for each 'RB id'. A UE detects a transmission start time of the corresponding MBMS service from 'Transmission start offset', and determines a transmission end time of the MBMS service by adding a value of 'Transmission duration' to the transmission start time. The MSCH information is valid for one MSCH period, and one MBMS service can be intermittently transmitted several times for one MSCH period.

cell where desired MSMS service is being serviced. The UE acquires partial combinable information for each of MBMS services mapped to the S-CCPCH by reading the current cell information (Table 1) and the neighboring cell information (Table 2) in the MSCH information. In addition, the UE acquires an 'MSCH schedule' IE indicating a position where the MSCH is located, from the current cell information in the MCCH information, and determines MSCH reception timing from the 'MSCH schedule' IE.

In step 320, the UE attempts to receive MSCH information from the S-CCPCH to which the desired MBMS service is mapped, at the MSCH reception timing. If the UE succeeds in receiving the MSCH information, the UE waits in a sleep state of a communication circuit without receiving the S-CCPCH until the desired MSMS service starts, in step 330. If a transmission start time of the desired MBMS service arrives in step 350, the UE proceeds to step 360. The transmission start time of the desired MBMS service can be determined from a 'Transmission start offset' IE in the MSCH information.

In step 360, the UE determines if the desired MBMS service is a partial combinable service, from the partial combinable information acquired in step 320. If the desired MBMS service is a partial combinable service, the UE simultaneously receives, in step 365, S-CCPCHs of other cells, being partial combinable with the desired MBMS service, determined from the partial combinable information, and an S-CCPCH of the primary cell, combines MBMS service sig-

TABLE 3

| Information Element/ Group name | Need | Multi | Type and reference | Semantics description |
| --- | --- | --- | --- | --- |
| Transport channel list | MP | 1 . . . maxTrCHper sCCPCH | | |
| >Transport channel id | MP | | | |
| >RB information list | MP | 1 . . . maxRB perTrCh | | |
| >>RB id | | | 0 . . . 15 | |
| >>Transport period list | MP | 1 . . . maxTrxPeriodsperService | | Indicates periods in which a transmission for this service might take place |
| >>>Transmission start offset | MP | | SFN offset | Offset relative to the start of this SCHEDULING INFORMATION message |
| >>>Transmission duration | MP | | TrxDuration | Period duration in frames |

Figure 3:
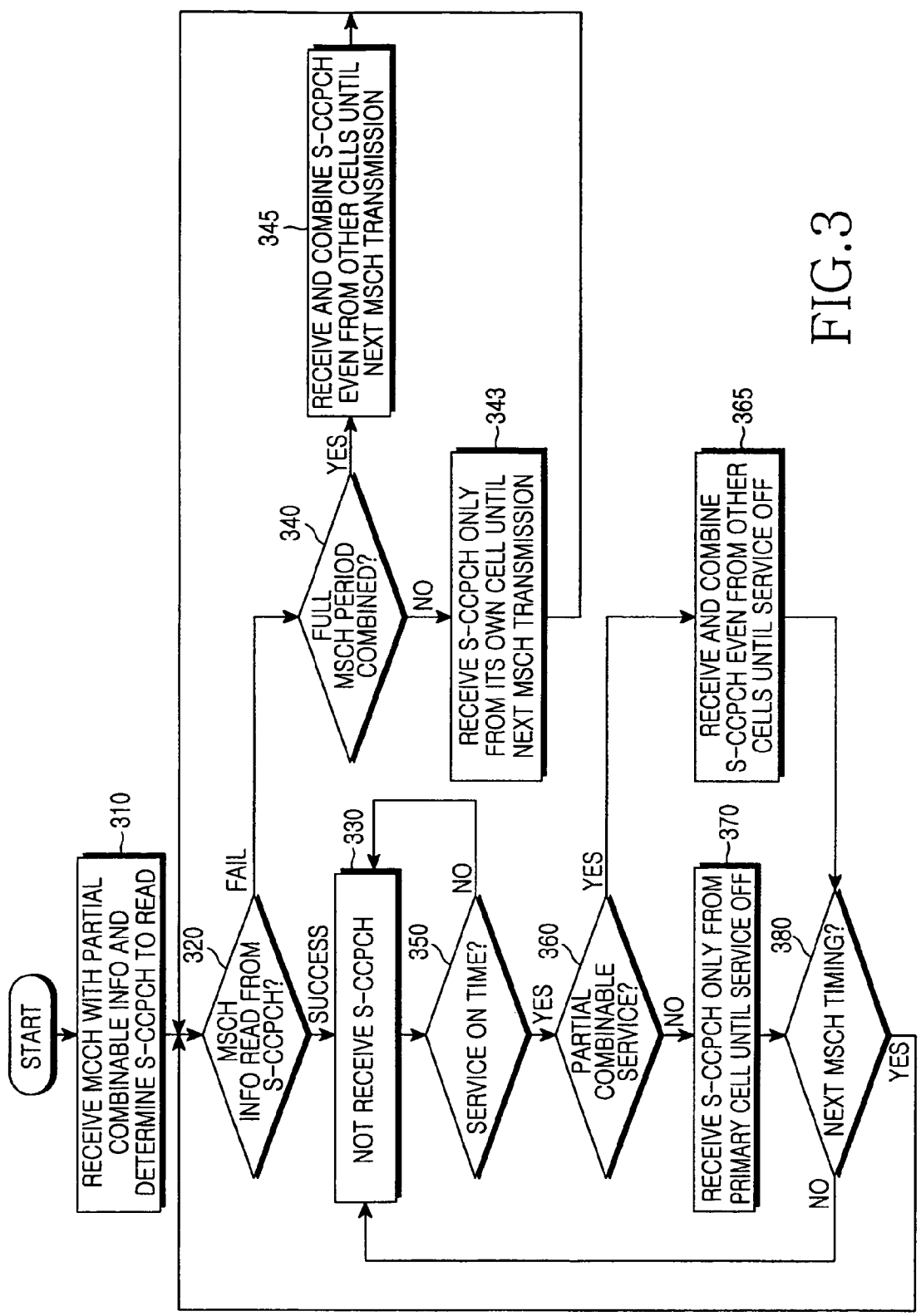
FIG. 3 is a flowchart illustrating an exemplary operation of a UE according to the first embodiment of the present invention.

FIG. 3 is a flowchart illustrating an operation of a UE according to the first embodiment of the present invention.

Referring to FIG. 3, in step 310, a UE desiring to receive an MBMS service receives MCCH information including partial combinable information from a primary cell where it is currently located, and determines an S-CCPCH of the primary nals of the received S-CCPCHs, and then proceeds to step 380. However, if partial combining is not possible, the UE proceeds to step 370 where it receives only the S-CCPCH of the primary cell and processes (demodulates and decodes) an MBMS service signal of the received S-CCPCH without combining.

After performing step 370 or 365 until a transmission end time of the desired MBMS service, specified in the MSCH information, arrives, the UE waits until it becomes the next MSCH reception timing, in step 380. The transmission end time of the desired MBMS service can be determined from the 'Transmission start offset' IE and the 'Transmission duration' EE in the MSCH information. If it has not become the next MSCH reception timing, the UE returns to step 330 where it transitions to the sleep state in which no S-CCPCH is received, and waits for the transmission start time of the desired MBMS service. However, if it has become the next MSCH reception timing, the UE returns to step 320 where it reads MSCH information and then performs its succeeding steps.

However, if the UE fails to correctly receive the MSCH information due to deep fading or other reasons in step 320, the UE determines in step 340 whether it will combine all of the S-CCPCH signals until the next MSCH reception timing according to a predetermined policy. This is a process of determining whether it should combine all of the receivable S-CCPCH signals in the full MSCH period between the current MSCH reception timing and the next MSCH reception timing. If it is determined that the S-CCPCH signals should not be combined in the current MSCH period, the UE receives, in step 343, only the S-CCPCH of the primary cell until the next MSCH reception timing, and processes the MBMS service signals of the received S-CCPCH without combining. However, if it is determined that the S-CCPCH signals should be combined in the full MSCH period, the UE simultaneously receives, in step 345, the S-CCPCH of the primary cell and S-CCPCHs of the other cells until the next MSCH reception timing, and combines MBMS service signals of the received S-CCPCHs.

Second Exemplary Embodiment

A second exemplary embodiment provides, every predetermined combining period of an S-CCPCH transmitted form one cell, combinable period information indicating partial-combinable physical channels of other cells to UEs located in the cell, desiring to receive an MBMS service, through an MCCH transmitted from the cell.

Figure 4:
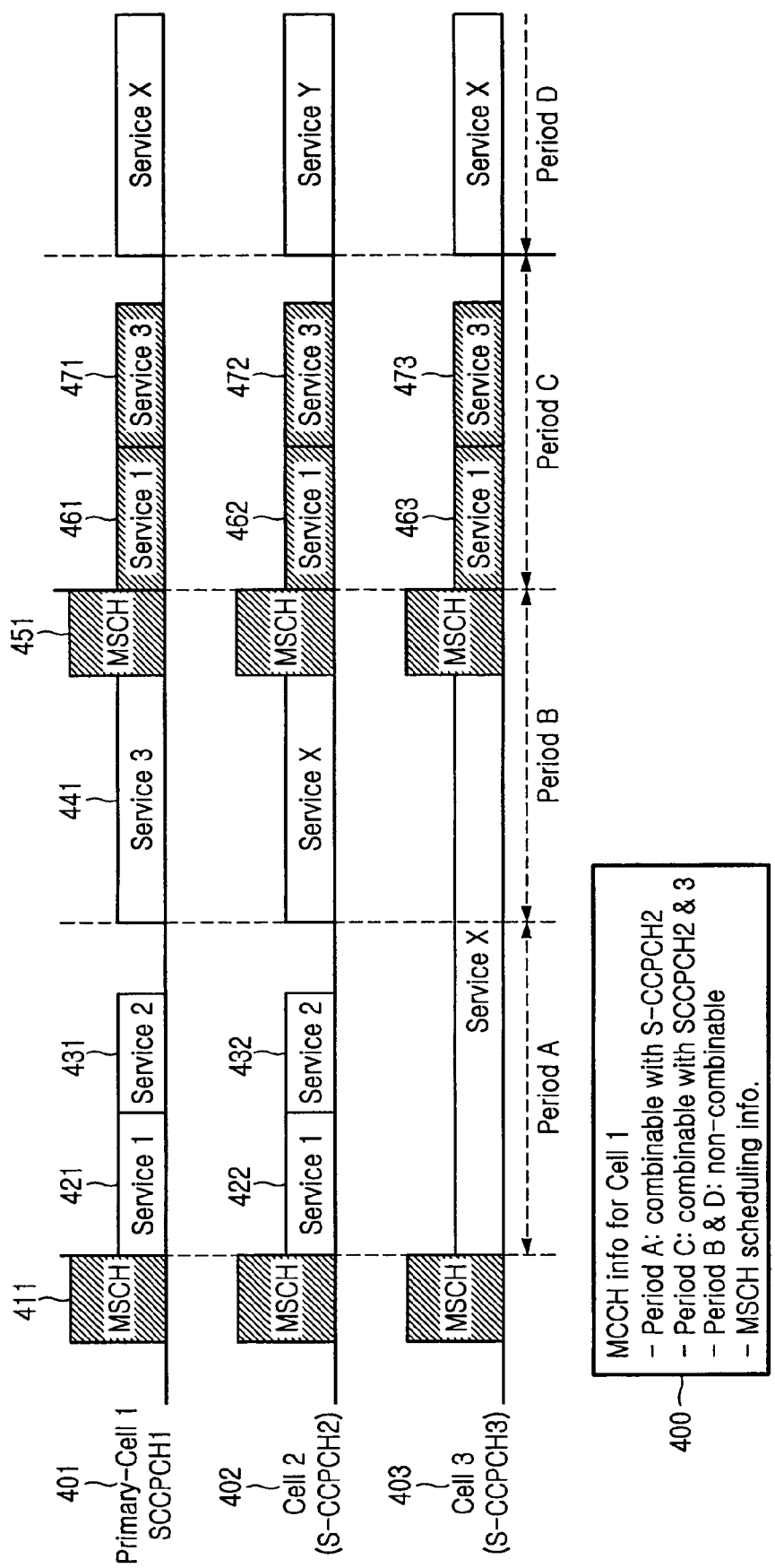
FIG. 4 is a diagram illustrating a channel structure according to a second exemplary embodiment of the present invention.

FIG. 4 is a diagram illustrating an exemplary channel structure according to the second embodiment of the present invention.

Referring to FIG. 4, in a cell#1 401 which is a primary cell, MBMS services are transmitted through an S-CCPCH1, and there are a cell#2 402 and a cell#3 403 neighboring the cell#1 401. In the cell#2 402 and the cell#3 403, when MBMS services are being transmitted through an S-CCPCH2 and an S-CCPCH3, MCCH information transmitted through an MCCH of the cell#1 401 includes combinable period information indicating whether partial combining is possible per period of the S-CCPCHs, and MSCH scheduling information.

The combinable period information indicates that the S-CCPCH1 is combinable with the S-CCPCH2 in a combining period A, and the S-CCPCH1 is combinable with both the S-CCPCH2 and the S-CCPCH3 in a combining period C. In addition, the combinable period information indicates that there are no combinable S-CCPCHs in combining periods B and D. Service signals transmitted in each of the combining periods can be combined as indicated by the combinable period information.

For example, an MTCH 421 of the S-CCPCH1 related to a service #1 is combinable with an MTCH 422 of the S-CCPCH2 in the combining period A, and an MTCH 431 of the S-CCPCH1 related to a service #2 is combinable with an MTCH 432 of the S-CCPCH2 in the combining period A. In the combining period C, an MTCH 461 of the S-CCPCH1 related to the service #1 is combinable with both an MTCH 362 of the S-CCPCH2 and an MTCH 463 of the S-CCPCH3, and an MTCH 471 of the S-CCPCH1 related to a service #3 is combinable with both an MTCH 372 of the S-CCPCH2 and an MTCH 473 of the S-CCPCH3. In combining periods B and D, no physical channel can be combined. For reference, all MSCH reception timings correspond to non-combinable periods because S-CCPCHs of the respective cells will be different from each other in scheduling.

The combinable period information is included in neighboring cell information transmitted through the MCCH of the cell#1 401.

Table 4 below illustrates an example of the neighboring cell information in which the combinable period information is included. The neighboring cell information includes 'cell identity' indicating a neighboring cell, and 'S-CCPCH list'. The 'S-CCPCH list' includes 'Secondary CCPCH info' including information necessary for receiving an S-CCPCH of the neighboring cell, 'Reference SCCPCH in current cell' indicating an S-CCPCH possible for L1 combining, 'Type of L1-combining' indicating rake combining or soft combining, 'L1-Combining schedule' indicating a possible L1 combining time, and 'Transport channel list'.

An RNC provides information on an S-CCPCH for carrying an MBMS service to each neighboring cell using the 'Secondary CCPCH info', and writes an S-CCPCH of the current cell, which is L1-combinable with an S-CCPCH of each neighboring cell, in 'Reference SCCPCH in current cell'. In addition, 'L1-combining schedule' indicates one or more periods in which each physical channel is partial combinable. In the case of 'L1-combining schedule', values of 32, 64 and 128 indicate that partial combining is possible when lower $5^{th}$, $6^{th}$ and $7^{th}$ bits of an SFN are all '0', and partial combining is not possible when the bits are all '1'. As another example, the RNC can specifically write the time for which each physical channel is partial combinable, in 'starting SFN' indicating a possible partial combining start time and 'duration' indicating a duration time, instead of the 'L1-combining schedule'.

Although 'L1-combining schedule' is specified in the neighboring cell information as combinable period information in Table 4 by way of example, the combinable period information can also be included in the current cell information as shown in Table 1 of the first embodiment. In the second embodiment, MSCH information is equal to that described with reference to Table 3.

TABLE 4

| Information Element/Group name | Need | Multi | Type and reference | Semantics description |
| --- | --- | --- | --- | --- |
| Cell identity | OP | | | Neighboring cell identity |
| S-CCPCH list | MP | maxSCCPCH | | |
| >Secondary CCPCH info | | | | |

TABLE 4-continued

| | | | | |
|---|---|---|---|---|
| >Reference sCCPCH in current cell | OP | | sCCPCH id | Only included if this sCCPCH is rake- or soft-combinable with an sCCPCH in the current cell |
| >Type of L1-combinig | CV-Ref | | Enumerated (Rake, Soft) | Only included if a reference id is included |
| >L1-Combining schedule | OP | | e.g. (32, 64, 128, 256, 512, 1024) | Indicates when the combining type indicated in the IE 'Type of combining' shall be used with reference sCCPCH in the current cell |
| >Transport channel list | MP | maxTrCH per sCCPCH | | |
| >>TrCh information for each TrCh | MP | | | All TrCh's are indicated if at least 1 RB on the sCCPCH is L2-combinable |
| >>RB information list | MP | maxRBperTrCh | | |
| >>>RB information per RB | MP | | | Only information for RB's for which L2-combining is supported are included. If included, this service provided in the neighboring cell is selective combinable with the service provide in the current cell if received in non-L1 combinable periods. |

| condition | Explanation |
|---|---|
| CV-Ref | Mandatory present when a reference sCCPCH is indicated. Otherwise, ignored. |

Similarly, the RNC in charge of scheduling on MTCHs mapped to each S-CCPCH, performs scheduling such that MTCHs for a combinable MBMS service are located in different S-CCPCHs in the same periods. An MTCH period for each MBMS service does not beyond one combining period.

Figure 5:
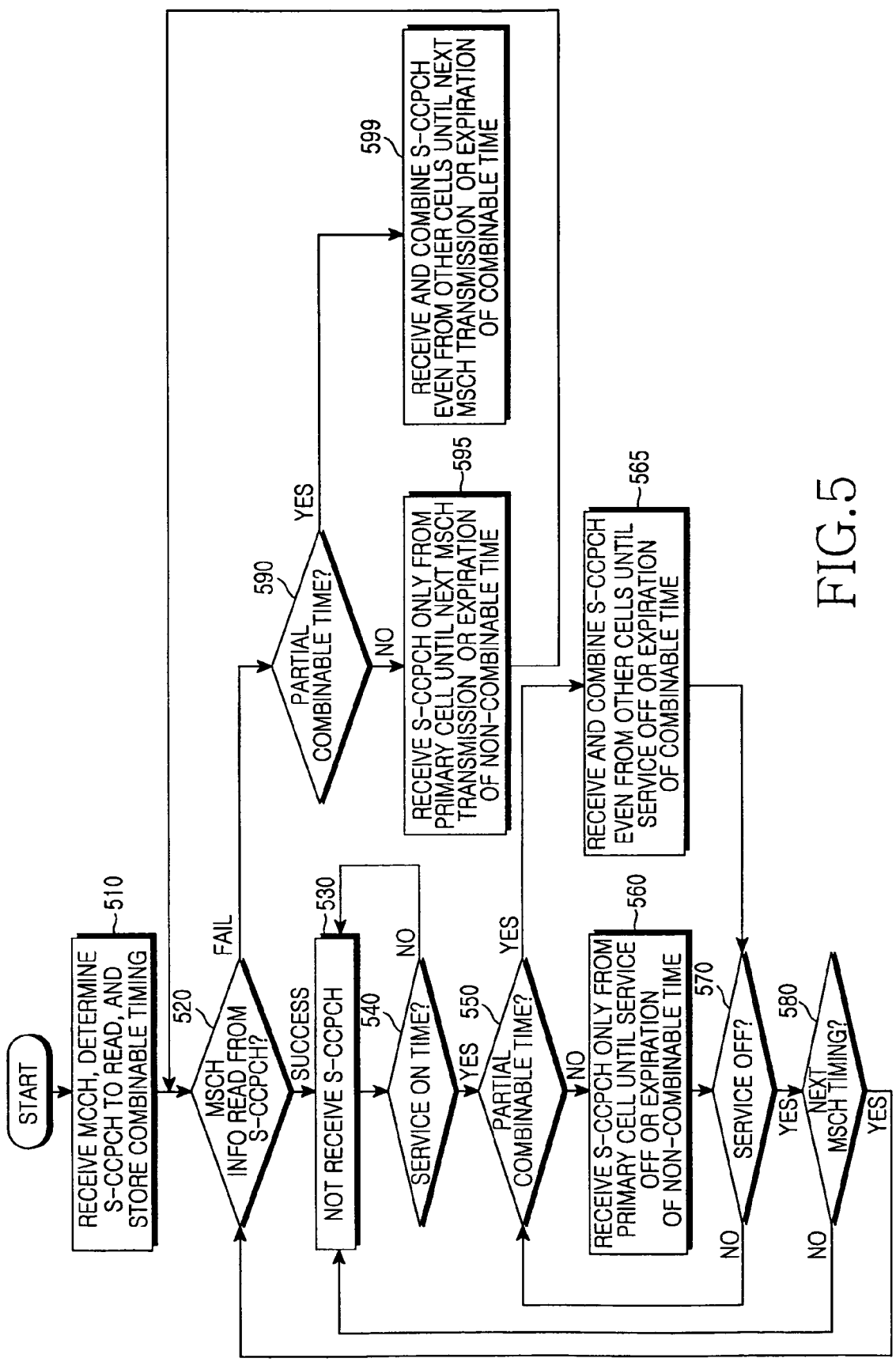
FIG. 5 is a flowchart illustrating an exemplary operation of a UE according to the second embodiment of the present invention.

FIG. 5 is a flowchart illustrating an exemplary operation of a UE according to the second embodiment of the present invention.

Referring to FIG. 5, in step 510, a UE desiring to receive an MBMS service receives MCCH information including combinable period information from a primary cell where it is currently located. Based on the MCCH information, the UE determines an S-CCPCH of the primary cell where desired MSMS service is being serviced, and stores combinable period information related to the determined S-CCPCH. In addition, the UE acquires an 'MSCH schedule' IE indicating a position where the MSCH is located, based on the current cell information in the MCCH information, and determines MSCH reception timing from the 'MSCH schedule' IE.

In step 520, the UE attempts to receive MSCH information from the determined S-CCPCH at the MSCH reception timing determined from the current cell information in the MCCH information. If the UE succeeds in receiving the MSCH information, the UE waits in a sleep state of a communication circuit without receiving the S-CCPCH until the desired MSMS service starts, in step 530. If a transmission start time of the desired MBMS service arrives in step 540, the UE wakes up and proceeds to step 550. The transmission start time of the desired MBMS service can be determined from a 'Transmission start offset' IE in the MSCH information.

In step 550, the UE analyzes the combinable period information, and if the current time corresponds to a combinable period, the UE proceeds to step 565. In step 565, the UE receives all of the S-CCPCH of the primary cell and combinable S-CCPCHs of the other cells until the desired MBMS service ends or the combinable period according to the combinable period information expires, and combines MBMS service signals of the received S-CCPCHs. However, if the current time does not correspond to the combinable period, the UE proceeds to step 560 where it receives only the S-CCPCH of the primary cell and processes an MBMS service signal of the received S-CCPCH without combining.

In step 570, the UE determines whether a transmission end time of the desired MBMS service has arrived, based on a 'Transmission start offset' IE and a 'Transmission duration' IE in the MSCH information, or whether the combinable period according to the combinable period information has expired. If it is determined that the combining is still possible, the UE returns to step 550 where it performs its succeeding steps. However, if the transmission end time has arrived or the combinable period has not expired, the UE proceeds to step 580 where the next MSCH reception timing has arrived. If the next MSCH reception timing has not arrived in step 580, the UE returns to step 530 where it performs its succeeding steps. However, if the next MSCH reception timing has arrived, the UE returns to step 520.

However, if it is determined in step 520 that the UE has failed to receive the MSCH information, the UE proceeds to step 590 where it determines whether the current time corresponds to a combinable period, based on the combinable period information acquired from the MCCH information. If the current time does not correspond to the combinable period, the UE receives only the S-CCPCH of the primary cell and processes an MBMS service signal of the received S-CCPCH without combining, in step 595. However, if the current time corresponds to the combinable period, the UE receives, in step 599, all of the S-CCPCH of the primary cell and combinable S-CCPCHs of the other cells, and combines MBMS service signals of the received S-CCPCHs.

Third Exemplary Embodiment

Figure 6:
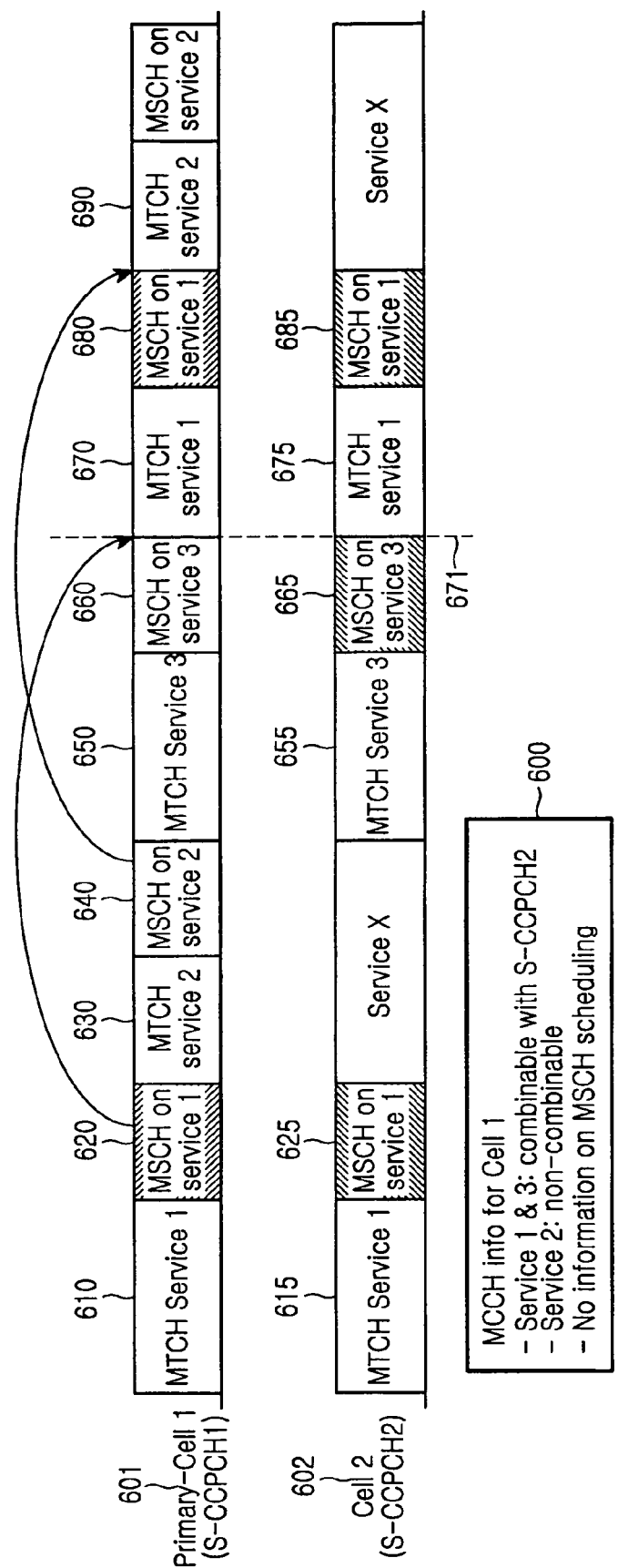
FIG. 6 is a diagram illustrating a channel structure according to a third exemplary embodiment of the present invention.

FIG. 6 is a diagram illustrating a channel structure according to a third exemplary embodiment of the present invention.

Referring to FIG. 6, in a cell#1 601, MBMS services are transmitted through an S-CCPCH1, and there is a cell#2 602 neighboring the cell#1 601. In the cell#2 602, MBMS services are being transmitted through an S-CCPCH2. MCCH information 600 for the cell#1 601 includes only the partial combinable information indicating different partial combinable physical channels for each service, and does not carry information on MSCH scheduling, namely, an 'MSCH schedule' IE.

As the information on MSCH scheduling is not carried on the MCCH information 600, the MSCH information includes information indicating when the next MTCH of a corresponding service will start, after an MTCH of each service ends in a corresponding S-CCPCH. Because the MSCH information is separated according to service before being transmitted, and MSCH information for two partial combinable services are transmitted with the same contents at the same time, the third embodiment can combine not only MTCHs but also MSCHs, thereby acquiring MSCH combining gain.

The partial combinable information transmitting through an MCCH in the cell#1 601 of FIG. 6 indicates that services #1 and #3 mapped to the S-CCPCH1 are combinable with the S-CCPCH2, and a service #2 is not combinable with any other physical channel. A UE, after receiving an MTCH 610 of the service #1, receives its succeeding MSCH 620 and then determines a start time 671 of the next MTCH 670 of the service #1. The UE, waiting in the sleep state of the communication circuit without receiving any S-CCPCH until the time 671, wakes up at the time 671 and successively receives an MSCH 680 succeeding the MTCH 670. Because the service #1 is partial combinable with the S-CCPCH2, the UE receives an MTCH 675 of the S-CCPCH2 and its succeeding MSCH 685 together, and combines the MTCH 675 and the MSCH 685 with the MTCH 670 and the MSCH 680.

The current cell information carried on an MCCH according to the third embodiment is analogous to that of Table 1 except that 'MSCH schedule' is missing. Similarly, when the partial combinable information is carried on the neighboring cell information before being transmitted through an MCCH, the neighboring cell information is equal to Table 2 in the contents.

Table 5 illustrates a simple example of the MSCH information for each service according to the third embodiment, and shows the next transmission start time and duration for each service with 'Transmission start offset' and 'Transmission duration'.

TABLE 5

| Information Element/ Group name | Need | Multi | Type and reference | Semantics description |
| --- | --- | --- | --- | --- |
| Transmission start offset | MP | | SFN offset | Offset relative to the start of this SCHEDULING INFORMATION message |
| Transmission duration | MP | | TrxDuration | Period duration in frames |

Similarly, the RNC in charge of scheduling on MTCHs mapped to each S-CCPCH, performs scheduling such that MTCHs for a combinable MBMS service are located in different S-CCPCHs in the same periods. In addition, the RNC controls cell transmitters for transmitting the S-CCPCHs such that they arrange an MSCH after every MTCH, and provides MSCH information carried on the MSCH.

Figure 7:
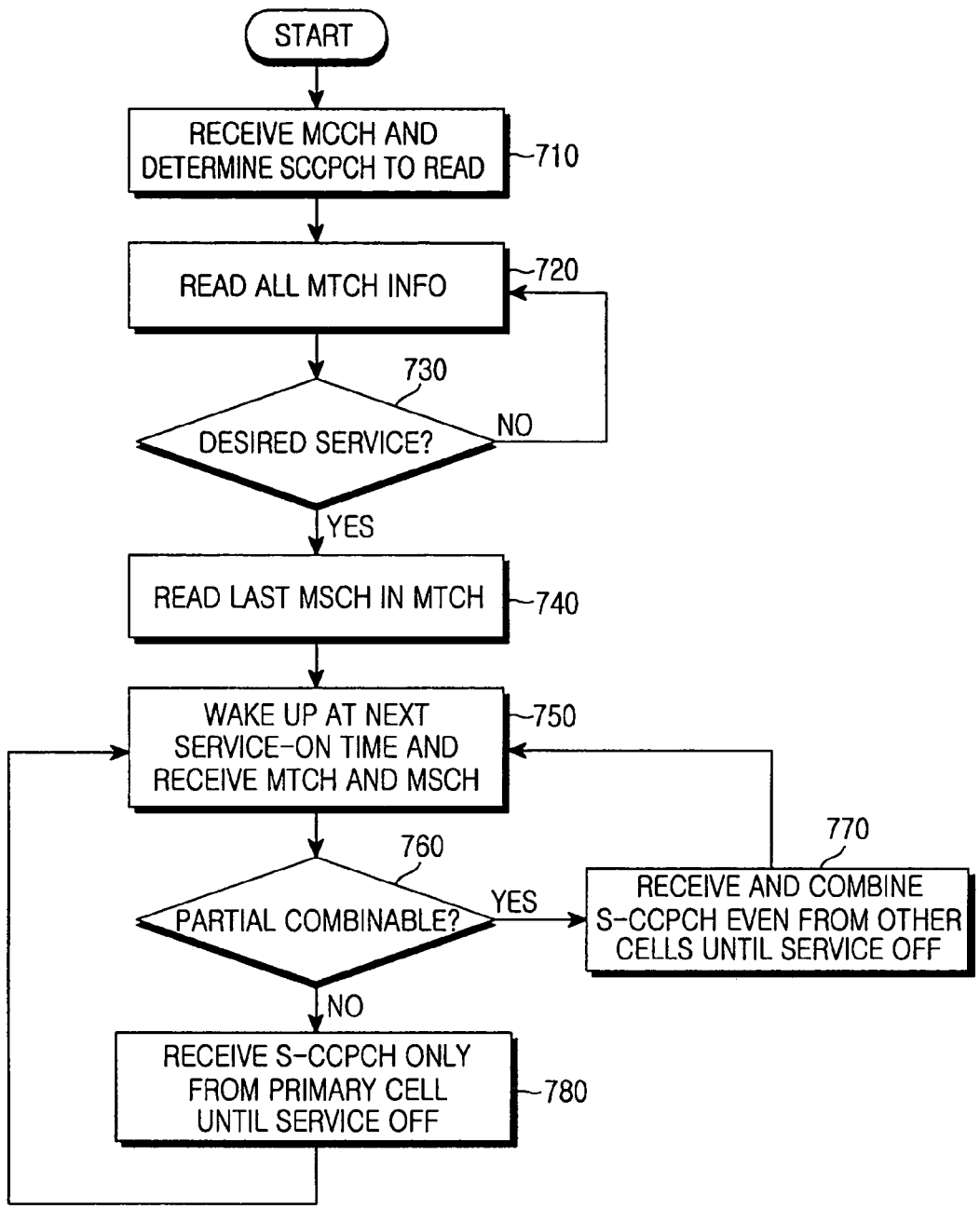
FIG. 7 is a flowchart illustrating an exemplary operation of a UE according to the third embodiment of the present invention.

FIG. 7 is a flowchart illustrating an operation of a UE according to the third embodiment of the present invention.

Referring to FIG. 7, in step 710, a UE desiring to receive an MBMS service receives MCCH information including partial combinable information from a primary cell where it is currently located. In this case, the MCCH information does not include an 'MSCH schedule' IE indicating a position where the MSCH is located. The UE detects an S-CCPCH of the primary cell, in which desired MBMS service is located, based on the MCCH information, and determines other S-CCPCHs with which the desired MBMS service is combinable, based on the partial combinable information.

If the UE fails to receive MSCH information, the UE continuously receives, in step 720, MTCHs mapped to the S-CCPCH of the primary cell until the desired MBMS service is received. In step 730, the UE determines whether the desired MBMS is detected. Upon detecting the desired MBMS service, the UE receives all of the MTCHs mapped to the MBMS service. In step 740, the UE reads an MSCH following the MTCHs, thereby determining the next transmission start time for the desired MBMS service. Because the UE has not failed to read an MTCH of the desired MBMS service from the S-CCPCHs of the other cells in step 730, the UE processes MBMS service signals of the MTCHs read from the S-CCPCH of the primary cell without combining.

In step 750, the UE, waiting in the sleep state of the communication circuit without receiving the S-CCPCH, wakes up at the next transmission start time and starts receiving the next MTCH mapped to the desired MBMS service and its succeeding MSCH through the S-CCPCH. After starting receiving the next MTCH, the UE determines in step 760 whether the desired MBMS service is partial combinable, based on the partial combinable information acquired in step 710. If the desired MBMS service is partial combinable, the UE simultaneously receives, in step 770, the S-CCPCH of the primary cell and S-CCPCHs of other cells, being partial combinable with the desired MBMS service, until a transmission end time of the desired service arrives, and combines MBMS service signals of the received S-CCPCHs. However, if the desired MBMS service is not partial combinable, the UE receives only the S-CCPCH of the primary cell and processes an MBMS service signal of the received S-CCPCH without combining, in step 780. The transmission end time can be determined from a 'Transmission start offset' EE and a 'Transmission duration' E in the MSCH information acquired in step 740. Upon arrival of the transmission end time in step 770 or 780, the UE returns to step 750 to receive the next MTCH and MSCH of the desired MBMS service.

Fourth Exemplary Embodiment

A fourth exemplary embodiment provides, for each MBMS service transmitted from one cell, partial combinable information indicating partial-combinable physical channels of other cells to UEs located in the cell through an MSCH transmitted from the cell. Therefore, the fourth embodiment can independently set partial combinability of each service every MSCH period.

Figure 8:
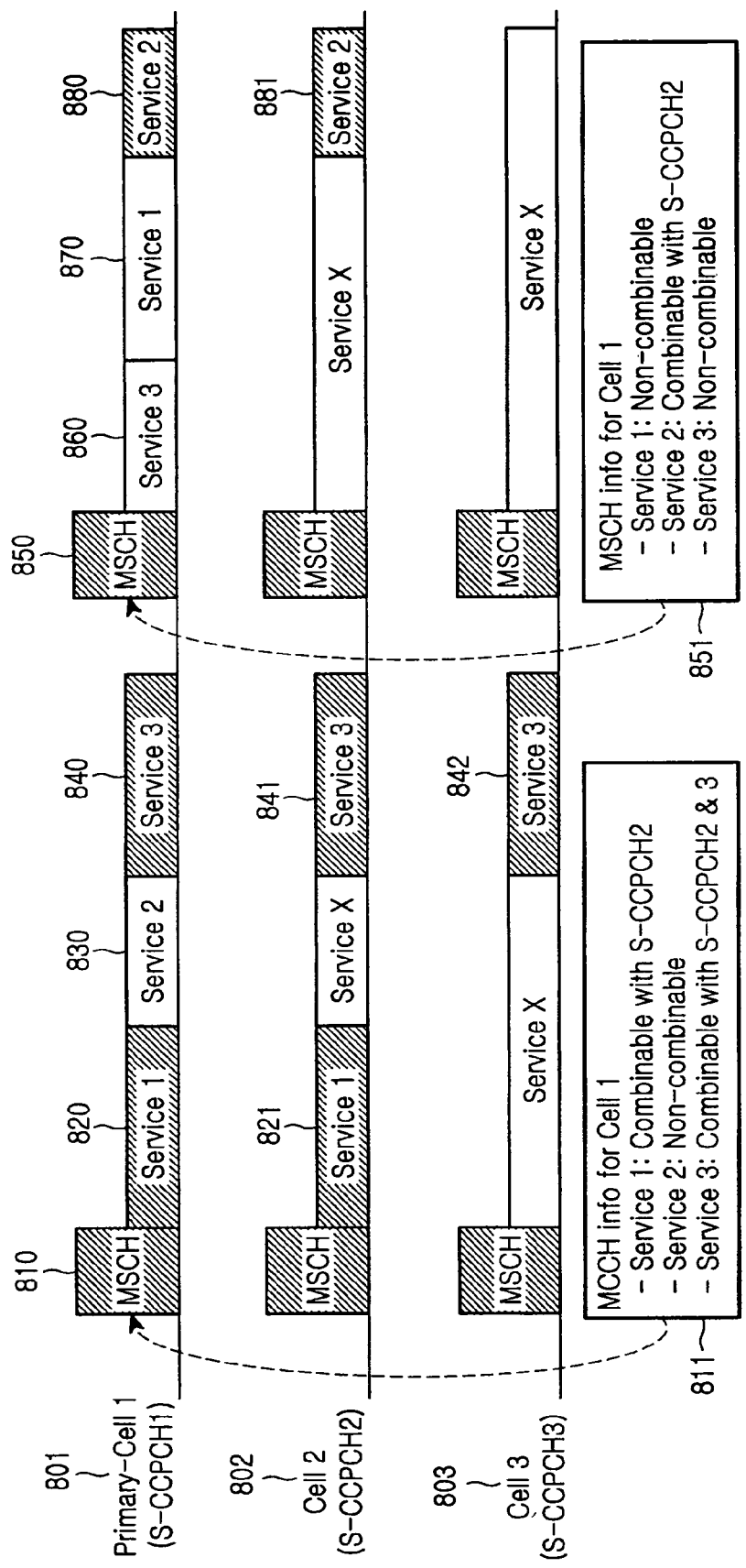
FIG. 8 is a diagram illustrating a channel structure according to a fourth exemplary embodiment of the present invention.

FIG. 8 is a diagram illustrating an exemplary channel structure according to the fourth embodiment of the present invention.

Referring to FIG. 8, in a cell#1 801 which is a primary cell, MBMS services are transmitted through an S-CCPCH1, and there are a cell#2 802 and a cell#3 803 neighboring the cell#1 801. In the cell#2 802 and the cell#3 803, MBMS services are being transmitted through an S-CCPCH2 and an S-CCPCH3, respectively. When services #1, #2 and #3 are transmitted in the S-CCPCH1 of the cell#1 801, partial combinable information 811 and 851 are carried on MSCHs 810 and 850 of the S-CCPCH1, respectively.

The first partial combinable information 811 indicates that for a first MSCH period from a first MSCH 810 till a second MSCH 850, the S-CCPCH1 is combinable with the S-CCPCH2 for the service #1, the S-CCPCH1 is combinable with the S-CCPCH2 and the S-CCPCH3 for the service #3, and there is no combinable physical channel for the service #2. The second partial combinable information 851 indicates that for a second MSCH period after the second MSCH 850, the S-CCPCH1 is combinable with only the S-CCPCH2 for the service #2. In this manner, the RNC can determine combinability of each service every MSCH period, so the fourth embodiment is higher than the first embodiment in terms of the degree of scheduling freedom.

Table 6 below illustrates an example of the MSCH information according to the fourth embodiment of the present invention.

The MSCH information includes 'Transport channel list', and the 'Transport channel list' includes 'RB information list' for each 'Transport channel id'. The 'RB information list' includes 'Transmission period list' for each 'RB id'. The 'Transmission period list' further includes 'secondary CCPCHs in other cells' indicating partial combinable information in addition to 'Transmission start offset' and 'Transmission duration'. If an MBMS service corresponding to the 'RB id' is not partial combinable, this IE is not included.

The UE determines whether desired MBMS service is partial combinable, not using the MCCH information but using partial combinable information for each service, acquired from the MSCH information. Similarly, the RNC in charge of scheduling on MTCHs mapped to each S-CCPCH, performs scheduling such that MTCHs for a combinable MBMS service are located in different S-CCPCHs in the same periods. In addition, the RNC provides MSCH information carried on the MSCH to cell transmitters for transmitting the S-CCPCHs.

Figure 9:
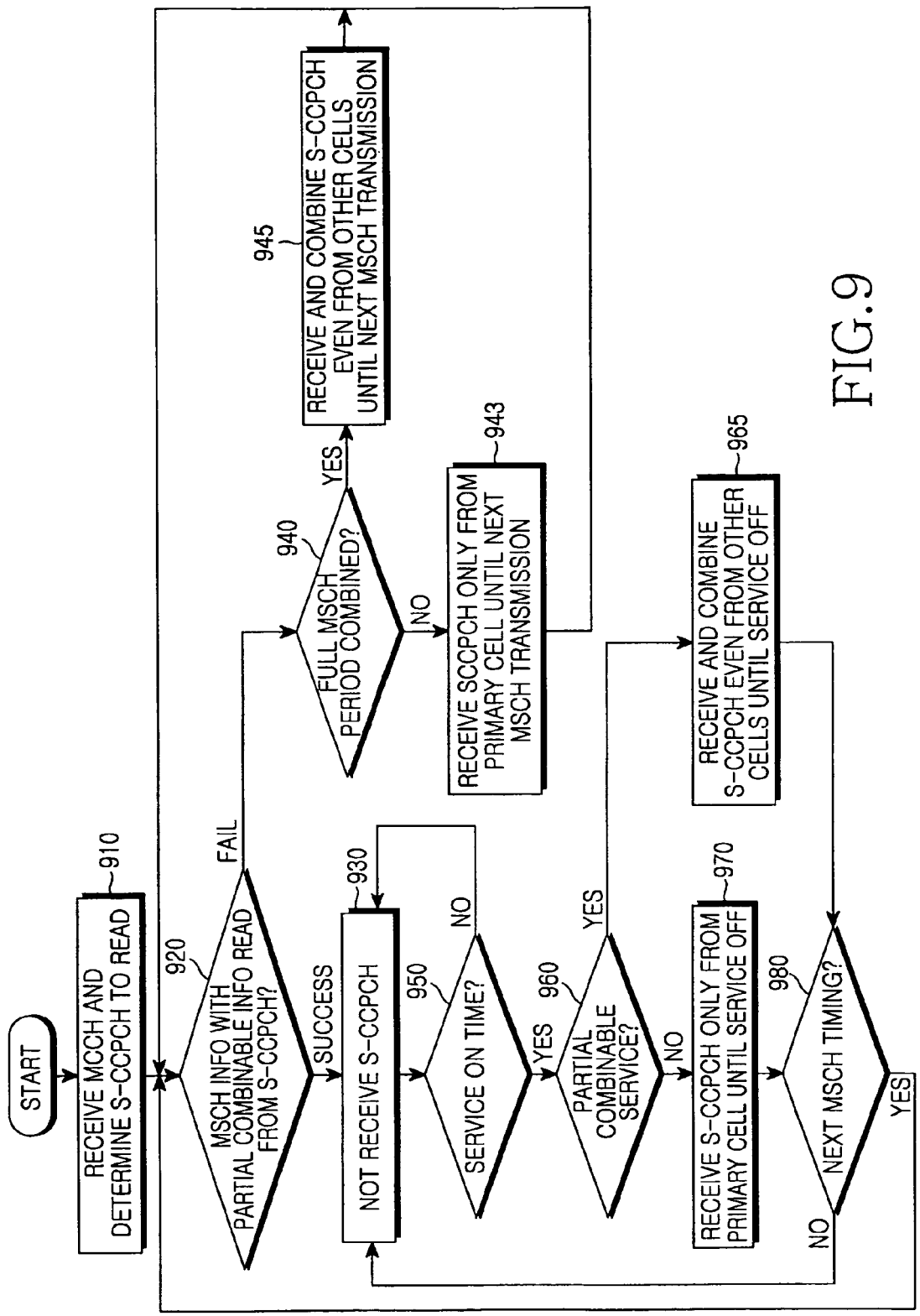
FIG. 9 is a flowchart illustrating an exemplary operation of a UE according to the fourth embodiment of the present invention.

FIG. 9 is a flowchart illustrating an operation of a UE according to the fourth embodiment of the present invention.

Referring to FIG. 9, in step 910, a UE desiring to receive an MBMS service receives MCCH information from a primary cell where it is currently located, and determines an S-CCPCH of the primary cell where desired MSMS service is being serviced. The UE acquires an 'MSCH schedule' IE indicating a position where the MSCH is located, from the current cell information in the MCCH information, and determines MSCH reception timing from the 'MSCH schedule' IE.

In step 920, the UE attempts to receive MSCH information from the S-CCPCH to which the desired MBMS service is mapped, at the MSCH reception timing. The MSCH information includes partial combinable information for each service. If the UE succeeds in receiving the MSCH information, the UE waits in the sleep state of the communication circuit without receiving the S-CCPCH until the desired MSMS service starts, in step 930. If a transmission start time of the desired MBMS service arrives in step 950, the UE proceeds to step 960. The transmission start time of the desired MBMS service can be determined from a 'Transmission start offset' IE in the MSCH information.

In step 960, the UE determines if the desired MBMS service is partial combinable, from the partial combinable information acquired in step 920. If the desired MBMS service is partial combinable, the UE simultaneously receives, in step

TABLE 6

| Information Element/Group name | Need | Multi | Type and reference | Semantics description |
|---|---|---|---|---|
| Transport channel list | MP | 1 ... maxTrCHpersCCPCH | | |
| >Transport channel id | MP | | | |
| >RB information list | MP | 1 ... maxRBperTrCh | | |
| >>RB id | | | 0 ... 15 | |
| >>Transmission period list | MP | 1 ... maxTrxPeriordsPerService | | Indicates periods in which a transmission for this service might take place |
| >>>Transmission start offset | MP | | SFN offset | Offset relative to the start of this SCHEDULING INFORMATION message |
| >>>Transmission duration | MP | | TrxDuration | Period duration in frames |
| >>>Secondary CCPCHs in other cells | MP | maxCombinableCells | | If not present, the service is not combined. |
| >>>>SCCPCH ID | MP | | Cell-ID + sCCPCH id | |
| >>>>Type of L1-combining | OP | | Enumerated (Rake, Soft) | Only included if L1 combining is used. Otherwise, selective combining is performed. |

965, S-CCPCHs of other cells, being partial combinable with the desired MBMS service, determined from the partial combinable information, and an S-CCPCH of the primary cell, combines MBMS service signals of the received S-CCPCHs, and then proceeds to step 980. However, if partial combining is not possible, the UE proceeds to step 970 where it receives only the S-CCPCH of the primary cell and processes an MBMS service signal of the received S-CCPCH without combining.

After performing step 970 or 965 until a transmission end time of the desired MBMS service, specified in the MSCH information, arrives, the UE waits until it becomes the next MSCH reception timing, in step 980. The transmission end time of the desired MBMS service can be determined from the 'Transmission start offset' IE and the 'Transmission duration' IE in the MSCH information. If it has not become the next MSCH reception timing, the UE returns to step 930 where it transitions to the sleep state in which no S-CCPCH is received, and waits for the transmission start time of the desired MBMS service. However, if it has become the next MSCH reception timing, the UE returns to step 920 where it reads MSCH information and then performs its succeeding steps.

However, if the UE fails to correctly receive the MSCH information due to deep fading or other reasons in step 920, the UE determines in step 940 whether it will combine all of the S-CCPCH signals until the next MSCH reception timing according to a predetermined policy. If the UE determines not to combine the S-CCPCH signals over the full MSCH period, the UE receives, in step 943, only the S-CCPCH of the primary cell until the next MSCH reception timing, and processes the MBMS service signals of the received S-CCPCH without combining. However, if the UE determines to combine the S-CCPCH signals over the full MSCH period, the UE simultaneously receives, in step 945, the S-CCPCH of the primary cell and S-CCPCHs of the other cells until the next MSCH reception timing, and combines MBMS service signals of the received S-CCPCHs.

Exemplary Transmission/Reception Structure

Figure 10:
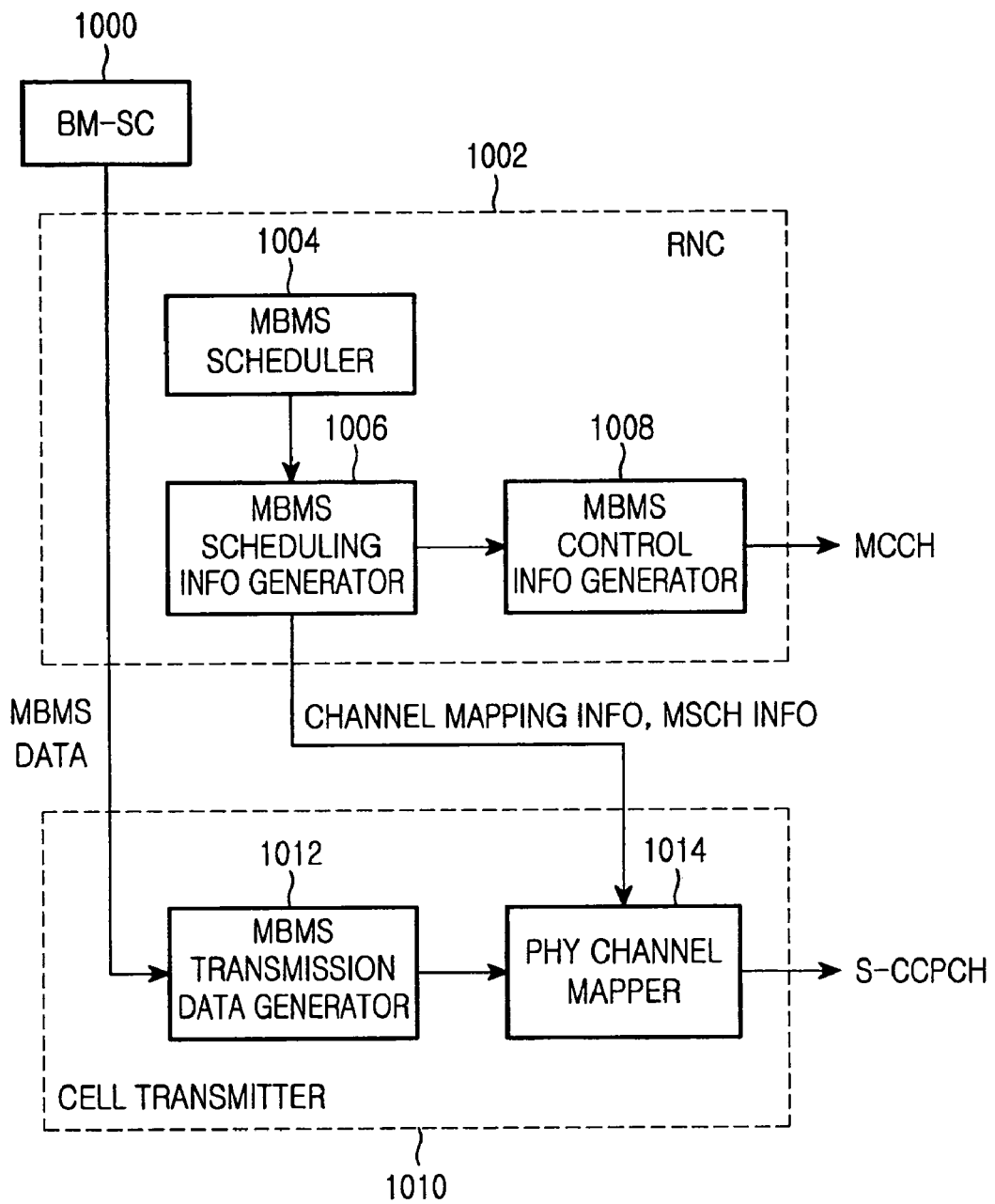
FIG. 10 is a diagram illustrating a transmission structure for an RNC and a cell according to an exemplary embodiment of the present invention.

FIG. 10 is a diagram illustrating a transmission structure for a cell and an RNC according to an exemplary embodiment of the present invention.

Referring to FIG. 10, an RNC 1002 receives MBMS data provided from a BM-SC 1000, and provides the received MBMS data to an MBMS transmission data generator 1012 of a cell transmitter 1010. The RNC 1002 provides data streams of the corresponding MBMS services to the cell transmitter 1010 based on a list of the cells to which it must transmit data streams of the MBMS services. The MBMS transmission data generator 1012 converts the MBMS data into a format that can be transmitted over a physical channel. Although only one cell transmitter 1010 is shown herein by way of example, the same structure and operation can be applied to all of a plurality of cell transmitters corresponding to a plurality of cells controlled by the RNC 1002.

The RNC 1002 includes an MBMS scheduler 1004, an MBMS scheduling information generator 1006, and an MBMS control information generator 1008. The RNC 1002 controls the channel structure for each cell according to the foregoing embodiments, generates MCCH information and transmits the MCCH information to the UEs located in its cells. The MBMS scheduler 1004 schedules MTCHs corresponding to MBMS services to be provided in an S-CCPCH of each cell according to MBMS services generated in the BM-SC 1000 and MBMS services that can be provided in a plurality of cells controlled by the RNC 1002. In this case, MTCHs for combinable MBMS services are arranged in different S-CCPCHs in the same periods.

The scheduling result is provided to the MBMS scheduling information generator 1006 where it is generated as MSCH information including MBMS scheduling information. The MBMS scheduling information generator 1006 generates channel mapping information indicating channel structures of the MSCH and the MTCH of each cell according to the scheduling result, and provides the MSCH information and the channel mapping information to a physical channel mapper 1014 of the cell transmitter 1010. In the case of the fourth embodiment, the MSCH information includes partial combinable information for each service with MSCH period along with timing information of each MTCH.

The MBMS control information generator 1008 generates MCCH information including control information related to all available MBMS services, and transmits the MCCH information to the UEs through a Uu interface. In the first and third embodiments, the MCCH information includes partial combinable information for each individual service, and in the second embodiment, the MCCH information includes partial combinable information for each individual period. In all of the embodiments except for the third embodiment, the MCCH information further includes MSCH scheduling information. In the fourth embodiment, the MCCH information does not include the partial combining-related information.

The physical channel mapper 1014 of the cell transmitter 1010 TDM-multiplexes the MSCH information provided from the MBMS scheduling information generator 1006 and the MBMS data provided from the MBMS transmission data generator 1012 according to the channel mapping information provided from the MBMS scheduling information generator 1006, and maps the multiplexed data to an S-CCPCH before transmission.

Figure 11:
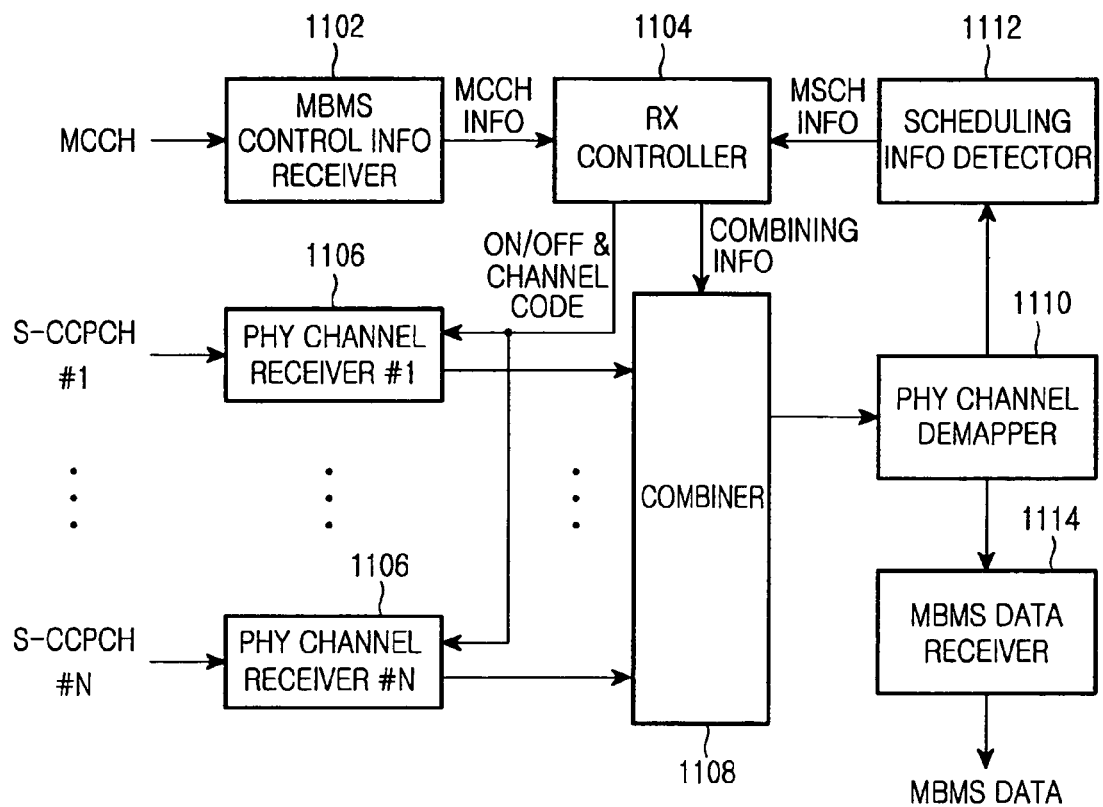
FIG. 11 is a diagram illustrating a reception structure of a UE according to an exemplary embodiment of the present invention.

FIG. 11 is a diagram illustrating a reception structure of a UE according to an exemplary embodiment of the present invention. The illustrated UE operates according to the flowcharts of the first to fourth embodiments.

Referring to FIG. 11, an MBMS control information receiver 1102 of a UE 1100 receives MCCH information from an RNC 1002 through an MCCH, and provides the received MCCH information to a reception controller 1104. In the case of the first through third embodiments, the reception controller 1104 acquires partial combinable information included in the MCCH information, and controls physical channel receivers 1106 according to the partial combinable information. The other physical channel receivers are powered off. In the case of the fourth embodiment, the reception controller 1104 acquires partial combinable information included in the MSCH information provided from a scheduling information detector 1112.

The reception controller 1104 determines at least one S-CCPCH related to a desired MBMS service, and provides a channel code for the determined S-CCPCH to at least one of the physical channel receivers 1106. When the desired MBMS service is partial combinable, channel codes for partial combinable S-CCPCHs are provided to the physical channel receivers 1106.

In all of the exemplary embodiments except for the third exemplary embodiment, the reception controller 1104 acquires MSCH scheduling information from the MCCH information, and detects MSCH reception timing based on the MSCH scheduling information. In the MSCH reception timing, at least one of the physical channel receivers 1106 operates to receive at least one MSCH signal, and provides the MSCH signal to a physical channel demapper 1110 through a combiner 1108. If a plurality of MSCH signals are received, the received MSCH signals are provided to the physical channel demapper 1110 after being combined by the combiner 1108. In the MSCH reception timing, the physical channel demapper 1110 provides the MSCH signals to the scheduling information detector 1112. The scheduling information detector 1112 detects MSCH information by analyzing the MSCH signals, and provides the MSCH information to the reception controller 1104.

In the case of the third exemplary embodiment, the scheduling information detector 1112 detects MSCH information each time an MTCH terminates. The reception controller 1104 determines a reception period of the desired MBMS service based on the MSCH information.

If the reception period of the desired MBMS service arrives, the physical channel receivers 1106 provided with channel codes operate to receive their associated MTCH signals. The received MTCH signals are provided to the physical channel demapper 1110 after being combined by the combiner 1108. If the desired MBMS service is not partial combinable, only one physical channel receiver corresponding to an S-CCPCH of the primary cell operates, and one received MTCH signal is by-passed to the physical channel demapper 1110, passing through the combiner 1108.

In the reception period of the desired MBMS service, the physical channel demapper 1110 provides the MTCH signal from the combiner 1108 to an MBMS data receiver 1114. The MBMS data receiver 1114 restores the MTCH signal into MBMS data through demodulation and decoding.

As can be understood from the foregoing description, exemplary implementations of the present invention enable partial combining for an MBMS service. Exemplary implementations specifically indicate, in an MCCH or an MSCH which is a kind of a logical channel for an MBMS service, whether an MBMS service signal is combinable with the same MBMS service signals received from different cells for each individual service or timing in a Uu interface, so a receiver combines the MBMS service signals transmitted from the different cells, thereby obtaining a gain in terms of the utilization of transmission power and radio resources.

While various exemplary aspects and implementations of the present invention have been shown and described with reference to a certain exemplary embodiment thereof, it will be understood by those skilled in the art that various changes in form and details may be made therein without departing from the spirit and scope of the invention as defined by the appended claims.

What is claimed is:

1. A method for performing partial combining on a desired Multimedia Broadcast/Multicast Service (MBMS) service by a user equipment (UE) in a mobile communication system supporting an MBMS service, the method comprising the steps of:
   receiving partial combinable information indicating at least one time period when a desired MBMS service is partial combinable between a physical channel of a current cell where the UE is located and physical channels of concerned neighboring cells;
   if a partial combining of the physical channel of the current cell with the physical channels of the neighboring cells is possible, according to the partial combinable information, receiving MBMS service signals of the desired MBMS service through the physical channel of the current cell and the partial-combinable physical channels of the neighboring cells; and
   combining the received MBMS service signals.

2. The method of claim 1, wherein the partial combinable information comprises a start time and duration, indicating the time periods for which the physical channels of the neighboring cells are combinable with the physical channel of the current cell, for the physical channels of the neighboring cells being combinable with the physical channel of the current cell.

3. The method of claim 2, wherein the start time and the duration are represented by a system frame number (SFN).

4. The method of claim 2, wherein at least one of current cell information and neighboring cell information in control information related to MBMS services, received through a control channel related to the MBMS services that can be provided in the current cell, comprises the partial combinable information.

5. The method of claim 1, wherein the partial combinable information comprises information indicating the physical channels of the neighboring cells, being combinable with the physical channel of the current cell, for each of partial combinable services among the MBMS services that can be provided in the current cells.

6. The method of claim 1, wherein the partial combinable information comprises information indicating combinability with the physical channel of the current cell, for each of partial combinable services among the MBMS services that can be provided in neighboring cells of the current cell.

7. The method of claim 1, wherein the partial combinable information comprises information indicating a combining method for the physical channel of the current cell and the partial-combinable physical channels of the neighboring cells.

8. The method of claim 1, further comprising the steps of:
   receiving control information related to MBMS services though a control channel related to the MBMS services that can be provided in the current cell; and
   checking the physical channel of the current cell for receipt of the desired MBMS service, using the control information.

9. The method of claim 8, wherein the step of receiving partial combinable information comprises the steps of:
   acquiring the partial combinable information form the control information;
   determining reception timing of scheduling information for the physical channel of the current cell using the control information;
   receiving the scheduling information through the physical channel of the current cell at the determined reception timing; and
   acquiring a transmission start time and duration of the desired MBMS service from the scheduling information.

10. The method of claim 9, further comprising the steps of:
    upon failure to receive the scheduling information at the determined reception timing, determining whether to combine all of the physical channels until the next reception timing; and
    if it is determined to combine all of the physical channels, receiving and combining MBMS service signals of the desired MBMS service through the physical channel of the current cell and all possible physical channels of the neighboring cells until the next reception timing.

11. The method of claim 8, wherein the step of receiving partial combinable information comprises the steps of:
    acquiring the partial combinable information from the control information;

receiving MBMS service signals of all MBMS services through the physical channel of the current cell until an MBMS service signal of the desired MBMS service is received;

if the MBMS service signal of the desired MBMS service is received, receiving scheduling information succeeding the MBMS service signal of the desired MBMS service, through the physical channel of the current cell; and acquiring the next transmission start time and duration of the desired MBMS service, from the scheduling information.

12. The method of claim 8, wherein the step of receiving partial combinable information comprises the steps of:

determining reception timing of scheduling information for the physical channel of the current cell using the control information;

receiving the scheduling information through the physical channel of the current cell at the determined reception timing; and acquiring a transmission start time and duration of the desired MBMS service, and the partial combinable information, from the scheduling information.

13. The method of claim 12, further comprising the steps of:

upon failure to receive the scheduling information at the determined reception timing, determining whether to combine all of the physical channels until the next reception timing; and if it is determined to combine all of the physical channels, receiving and combining MBMS service signals of the desired MBMS service through the physical channel of the current cell and all possible physical channels of the neighboring cells until the next reception timing.

14. An apparatus for performing partial combining on a desired Multimedia Broadcast/Multicast Service (MBMS) service by a user equipment (UE) in a mobile communication system supporting an MBMS service, the apparatus comprising:

a receiver for receiving partial combinable information indicating at least one time period when a desired MBMS service is partial combinable between a physical channel of a current cell where the UE is located and physical channels of concerned neighboring cells;

a reception controller for determining whether a partial combining of the physical channel of the current cell with the physical channels of the neighboring cells, according to the partial combinable information, is possible;

physical channel receivers for, if the partial combining is possible, receiving MBMS service signals of the desired MBMS service through the physical channel of the current cell and the partial-combinable physical channels of the neighboring cells; and a combiner for combining the received MBMS service signals.

15. The apparatus of claim 14, wherein the partial combinable information comprises a start time and duration, indicating the time periods for which the physical channels of the neighboring cells are combinable with the physical channel of the current cell, for the physical channels of the neighboring cells being combinable with the physical channel of the current cell.

16. The apparatus of claim 15, wherein the start time and the duration are represented by a system frame number (SFN).

17. The apparatus of claim 15, wherein at least one of current cell information and neighboring cell information in control information related to MBMS services, received through a control channel related to the MBMS services that can be provided in the current cell, comprises the partial combinable information.

18. The apparatus of claim 14, wherein the partial combinable information comprises information indicating the physical channels of the neighboring cells, being combinable with the physical channel of the current cell, for each of partial combinable services among the MBMS services that can be provided in the current cell.

19. The apparatus of claim 14, wherein the partial combinable information comprises information indicating combinability with the physical channel of the current cell, for each of partial combinable services among the MBMS services that can be provided in neighboring cells of the current cell.

20. The apparatus of claim 14, wherein the partial combinable information comprises information indicating a combining method for the physical channel of the current cell and the partial-combinable physical channels of the neighboring cells.

21. The apparatus of claim 14, wherein the reception controller checks the physical channel of the current cell for receipt of the desired MBMS service, using control information related to MBMS services, received through a control channel related to the MBMS services that can be provided in the current cell.

22. The apparatus of claim 21, wherein the reception controller comprises:

determining reception timing of scheduling information for the physical channel of the current cell using the control information; and controlling the physical channel receivers so that each of the physical channel receivers receives the scheduling information through the physical channel of the current cell at the determined reception timing, wherein the scheduling information indicates a transmission start time and duration of the desired MBMS service.

23. The apparatus of claim 22, wherein the reception controller comprises:

upon failure to receive the scheduling information at the determined reception timing, determining whether to combine all of the physical channels until the next reception timing; and if it is determined to combine all of the physical channels, controlling the physical channel receivers such that each of the physical channel receivers receives MBMS service signals of the desired MBMS service through the physical channel of the current cell and all possible physical channels of the neighboring cells until the next reception timing.

24. The apparatus of claim 21, wherein the physical channel receiver of the current cell among the physical channel receivers comprises:

receiving MBMS service signals of all MBMS services through the physical channel of the current cell until an MBMS service signal of the desired MBMS service is received; and if the MBMS service signal of the desired MBMS service is received, receiving scheduling information succeeding the MBMS service signal of the desired MBMS service, through the physical channel of the current cell, wherein the scheduling information indicates the next transmission start time and duration of the desired MBMS service.

25. The apparatus of claim 21, wherein the reception controller determines reception timing of scheduling information for the physical channel of the current cell using the control information, and controls the physical channel receivers so that each of the physical channel receivers receives the scheduling information through the physical channel of the current cell at the determined reception timing, wherein the scheduling information indicates a transmission start time and duration of the desired MBMS service, and the partial combinable information 26. The apparatus of claim 25, wherein the reception controller comprises:
upon failure to receive the scheduling information at the determined reception timing, determining whether to combine all of the physical channels until the next reception timing; and
if it is determined to combine all of the physical channels, controlling the physical channel receivers such that each of the physical channel receivers receives MBMS service signals of the desired MBMS service through the physical channel of the current cell and all possible physical channels of the neighboring cells until the next reception timing 27. A method for supporting partial combining on a Multimedia Broadcast/Multicast Service (MBMS) service that a user equipment (UE) desires to receive, in a mobile communication system supporting an MBMS service, the method comprising the steps of:
generating partial combinable information indicating at least one time period when a desired MBMS service of the UE is partial combinable between a physical channel of a current cell where the UE is located and physical channels of concerned neighboring cells;
transmitting the generated partial combinable information; and
transmitting MBMS service signals of the desired MBMS service through the physical channel of the current cell and the partial-combinable physical channels of the neighboring cells, at a transmission start time of the desired MBMS service.

28. The method of claim 27, wherein the partial combinable information comprised a start time and duration, indicating time periods for which the physical channels of the neighboring cells are combinable with the physical channel of the current cell, for the physical channels of the neighboring cells being combinable with the physical channel of the current cell.

29. The method of claim 28, wherein the start time and the duration are represented by a system frame number (SFN).

30. The method of claim 28, wherein at least one of current cell information and neighboring cell information in control information related to MBMS services, received through a control channel related to the MBMS services that can be provided in the current cell, comprises the partial combinable information.

31. The method of claim 30, wherein the control information further comprises information indicating reception timing of scheduling information for the physical channel of the current cell, wherein the scheduling information indicates a transmission start time and duration of the desired MBMS service.

32. The method of claim 27, wherein the partial combinable information comprises information indicating the physical channels of the neighboring cells, being combinable with the physical channel of the current cell, for each of partial combinable services among the MBMS services that can be provided in the current cell 33. The method of claim 27, wherein the partial combinable information comprised information indicating combinability with the physical channel of the current cell, for each of partial combinable services among the MBMS services that can be provided in neighboring cells of the current cell.

34. The method of claim 27, wherein the partial combinable information comprises information indicating a combining method for the physical channel of the current cell and the partial-combinable physical channels of the neighboring cells 35. The method of claim 27, wherein scheduling information that is transmitted through the physical channel of the current cell comprises the partial combinable information which indicates a transmission start time and duration of the desired MBMS service 36. An apparatus for supporting partial combining on a Multimedia Broadcast/Multicast Service (MBMS) service that a user equipment (UE) desires to receive, in a mobile communication system supporting an MBMS service, the apparatus comprising:
a radio network controller (RNC) for generating partial combinable information indicating at least one time period when desired MBMS service of the UE is partial combinable between a physical channel of a current cell where the UE is located and physical channels of concerned neighboring cells; and
a plurality of cell transmitters for transmitting MBMS service signals of the desired MBMS service through the physical channel of the current cell and the partial-combinable physical channels of the neighboring cells, at a transmission start time of the desired MBMS service.

37. The apparatus of claim 36, wherein the partial combinable information comprises a start time and duration, indicating the time periods for which the physical channels of the neighboring cells are combinable with the physical channel of the current cell, for the physical channels of the neighboring cells being combinable with the physical channel of the current cell.

38. The apparatus of claim 37, wherein the start time and the duration are represented by a system frame number (SFN).

39. The apparatus of claim 37, wherein at least one of current cell information and neighboring cell information in control information related to MBMS services, received through a control channel related to the MBMS services that can be provided in the current cell, comprises the partial combinable information.

40. The apparatus of claim 39, wherein the control information further comprises information indicating reception timing of scheduling information for the physical channel of the current cell, wherein the scheduling information indicates a transmission start time and duration of the desired MBMS service.

41. The apparatus of claim 36, wherein the partial combinable information comprised information indicating the physical channels of the neighboring cells, being combinable with the physical channel of the current cell, for each of partial combinable services among the MBMS services that can be provided in the current cell.

42. The apparatus of claim 36, wherein the partial combinable information comprises information indicating combinability with the physical channel of the current cell, for each of partial combinable services among the MBMS services that can be provided in neighboring cells of the current cell.

43. The apparatus of claim 36, wherein the partial combinable information comprises information indicating a combining method for the physical channel of the current cell and the partial-combinable physical channels of the neighboring cells.

44. The apparatus of claim 36, wherein scheduling information that is transmitted through the physical channel of the current cell comprises the partial combinable information which indicates a transmission start time and duration of the desired MBMS service.

* * * * *